(12) United States Patent
Iwakirii et al.

(10) Patent No.: US 7,473,441 B2
(45) Date of Patent: Jan. 6, 2009

(54) CURABLE COMPOSITION AND SEALING METHOD FOR CERAMIC SIDING BOARDS

(75) Inventors: Hiroshi Iwakirii, Kobe (JP); Shintaro Komitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 590 days.

(21) Appl. No.: 10/522,028

(22) PCT Filed: Jul. 9, 2003

(86) PCT No.: PCT/JP03/08741

§ 371 (c)(1),
(2), (4) Date: Jan. 21, 2005

(87) PCT Pub. No.: WO2004/011553

PCT Pub. Date: Feb. 5, 2004

(65) Prior Publication Data

US 2005/0272835 A1    Dec. 8, 2005

(30) Foreign Application Priority Data

| Jul. 25, 2002 | (JP) | ............................. | 2002-217337 |
| Jul. 25, 2002 | (JP) | ............................. | 2002-217338 |
| Oct. 17, 2002 | (JP) | ............................. | 2002-303580 |
| Oct. 17, 2002 | (JP) | ............................. | 2002-303581 |

(51) Int. Cl.
*B05D 3/00* (2006.01)
(52) U.S. Cl. .................. 427/387; 427/393.6; 528/35; 528/901; 525/100
(58) Field of Classification Search ................ 427/387, 427/393.6; 528/35, 901; 525/100
See application file for complete search history.

(56) References Cited

U.S. PATENT DOCUMENTS

| 5,731,407 | A | 3/1998 | Le-Khac |
| 5,900,384 | A | 5/1999 | Soltani-Ahmadi et al. |
| 6,486,289 | B1 * | 11/2002 | Yamaguchi et al. ........... 528/18 |
| 7,297,743 | B2 * | 11/2007 | Kanamori et al. ........... 524/523 |

FOREIGN PATENT DOCUMENTS

| JP | 04-266986 A | 9/1992 |
| JP | 07-233316 A | 9/1995 |
| JP | 11-012455 A | 1/1999 |
| JP | 2001-172609 A | 6/2001 |
| JP | 2002-069288 A | 3/2002 |
| JP | 2002-129004 A | 5/2002 |
| JP | 2002-155201 A | 5/2002 |
| JP | 2002-179904 A | 6/2002 |
| JP | 2002-194204 A | 7/2002 |
| JP | 2002-201350 A | 7/2002 |

OTHER PUBLICATIONS

Translation of JP2002-194204, Jul. 10, 2002.*
International Search Report for PCT/JP03/08741 dated Oct. 14, 2003.
Sealing News 35, Jan. 25, 1989, pp. 15-27 and 40.
Liu, et al, "Preparation and Characterization of Double Metal Cyanide Complex Catalysts," *Molecules* 8:67-73 (2003).

* cited by examiner

*Primary Examiner*—Erma Cameron
(74) *Attorney, Agent, or Firm*—Sughrue Mion, PLLC

(57) ABSTRACT

Provided is a curable composition comprising a reactive silicon group-containing polyoxyalkylene polymer (A), such as a reactive silicon group-containing polyoxypropylene; a reactive silicon group-containing vinyl polymer (B), such as a reactive silicon group-containing (meth)acrylate polymer; and a polyoxyalkylene plasticizer (C) having a low molecular weight, such as polyoxypropylene, the curable composition providing a rubber-like cured object by crosslinking reaction in the presence of moisture. Also provided is a method for sealing ceramic siding boards comprising applying the curable composition as a sealant and curing the curable composition.

27 Claims, No Drawings

CURABLE COMPOSITION AND SEALING METHOD FOR CERAMIC SIDING BOARDS

CROSS REFERENCE TO RELATED APPLICATIONS

This application is a National Stage Entry of PCT application PCT/JP03/08741 filed on Jul. 9, 2003, claiming priority to Japanese Application No. 2002-217337 filed on Jul. 25, 2002, Japanese Application No. 2002-217338 filed on Jul. 25, 2002, Japanese Application No. 2002-303580 filed on Oct. 17, 2002 and Japanese Application No. 2002-303581 filed on Oct. 17, 2002.

TECHNICAL FIELD

The present invention relates to a novel curable composition containing an oxyalkylene polymer having a silicon atom-containing functional group crosslinkable by formation of a siloxane bond (hereinafter also referred to as "reactive silicon group"), and a method for sealing ceramic siding boards.

BACKGROUND ART

Room temperature curing compositions based on oxyalkylene polymers containing reactive silicon groups can be used, for example, as sealants for construction (commonly referred to as "modified silicone sealants"), and have high performance. Among various characteristics required for such curing compositions, mechanical properties, such as modulus, elongation at break, and strength at break, along with long-lasting weatherability are important. Various studies have been conducted on these properties. As a result, with respect to mechanical properties, such as modulus, elongation at break, and strength at break, it is known that by adding a phthalate ester, a polyether plasticizer, or the like to a curable composition, physical properties suitable for sealants can be obtained. With respect to weatherability, each of Japanese Unexamined Patent Application Publication Nos. 59-122541, 60-031556, 63-112642, 6-172631, 7-90171, etc., discloses that by blending a reactive silicon group-containing vinyl polymer with a reactive silicon group-containing oxyalkylene polymer, the weatherability can be improved compared with when the reactive silicon group-containing oxyalkylene polymer is used alone.

Ceramic siding boards are inexpensive, fire-resistant construction materials used for walls or the like which are produced by compounding main raw materials, such as cement, fly ash, or perlite, with organic fibers, etc., followed by hardening. When siding boards are constructed, since gaps (joints) occur between the siding boards, waterproof and airproof treatment is performed using sealants. With the recent prolongation of performance guarantee time for buildings, such as houses, sealants are also required not to deteriorate with time. Sealants in general, including sealants for construction, are required to have high elongation at break. In particular, with respect to sealants for ceramic siding boards in which large shrinkages occur with time, high elongation at break is required.

For example, according to the test method for sealants for ceramic siding established by Japan Fiber Reinforced Cement Siding Manufacturers Association, an elongation at break of 250% or more is required. However, in expectation of deterioration with time, desirably, the elongation at break is twice as large as this value, i.e., 500% or more, and preferably 600% or more. Furthermore, since sealants for siding boards are directly exposed to outdoor environment, weatherability is required.

With respect to a cured object obtained from a composition containing a reactive silicon group-containing oxyalkylene polymer and a reactive silicon group-containing vinyl polymer, it has been found that although excellent weatherability is exhibited, elongation at break is lower than that of a cured object obtained from a composition which does not contain a reactive silicon group-containing vinyl polymer. In particular, as the sealant used for joints of ceramic siding boards, the elongation at break is insufficient. When a composition which contains a reactive silicon group-containing oxyalkylene polymer and a reactive silicon group-containing vinyl polymer and which produces a cured object with low elongation at break is used, in order to obtain sufficient elongation at break, a large amount of plasticizer must be used, and thus compounding is restricted, which is disadvantageous. Consequently, it is necessary to modify the reactive silicon group-containing oxyalkylene polymer and/or the reactive silicon group-containing vinyl polymer so that the resultant cured object has excellent elongation properties.

Furthermore, as described in "Kenchikuyo sealants (Sealants for construction)" (published by Japan Sealant Industry Association), at page 158, phthalate ester plasticizers having high plasticizing effect are often used for reactive silicon group-containing oxyalkylene polymers. Recently, in view of environmental concerns, use of plasticizers other than phthalate ester plasticizers is required in some cases. However, even if a polymer which produces a cured object with excellent elongation properties is obtained, if the plasticizing efficiency of the plasticizer is low, the improvement effect of the polymer is cancelled out.

Furthermore, it is generally known that if the molecular weight of the polymer in the composition, in particular, the molecular weight between crosslinking points (molecular weight of the chain between reactive silicon groups), increases, elongation properties improve. However, if the molecular weight of the polymer increases, the viscosity of the polymer increases, which in turn increases the viscosity of the composition, and workability decreases when the composition is used as the sealant. In particular, when a high molecular weight plasticizer, such as polypropylene glycol (PPG), is used, the viscosity of the composition increases compared with the use of a low molecular weight plasticizer, such as di(2-ethylhexyl) phthalate (DOP) or diisodecyl phthalate (DIDP).

DISCLOSURE OF INVENTION

It is an object of the present invention to provide a curable composition comprising a reactive silicon group-containing oxyalkylene polymer, a reactive silicon group-containing vinyl polymer, and a non-phthalate ester plasticizer, the reactive silicon group-containing polymers providing excellent elongation properties to the resulting cured object, the non-phthalate ester plasticizer having the same plasticizing efficiency as that of a phthalate ester plasticizer. It is another object of the present invention to provide a method for sealing siding boards comprising filling the joints of ceramic siding boards with the curable composition, and then curing the curable composition, in which satisfactory workability is achieved and excellent elongation properties are provided to the resulting cured object.

The present inventors have found that in order to improve the elongation at break of a cured object obtained from a curable composition comprising a reactive silicon group-containing oxyalkylene polymer and a reactive silicon group-containing vinyl polymer, it is very effective to set the number-average molecular weight of the reactive silicon group-containing oxyalkylene polymer (A) at 16,000 or more, and that an oxyalkylene polymeric plasticizer is an excellent plasticizer. Thus, the present invention has been achieved. Namely, the present invention relates to the following aspects:

A curable composition comprising an oxyalkylene polymer (A) having a number-average molecular weight of 16,000 or more, the oxyalkylene polymer (A) containing a silicon atom-containing functional group crosslinkable by formation of a siloxane bond; a vinyl polymer (B) containing a silicon atom-containing functional group crosslinkable by formation of a siloxane bond; and an oxyalkylene polymeric plasticizer (C) having a smaller molecular weight than that of the polymer (A);

The curable composition in which the oxyalkylene polymer (A) is at least one selected from the group consisting of polyethylene oxide, polypropylene oxide, propylene oxide-ethylene oxide copolymers, and polybutylene oxide;

The curable composition in which the oxyalkylene polymer (A) is an oxypropylene polymer;

The curable composition in which the backbone chain of the oxyalkylene polymer (A) is a polymer prepared using a double metal cyanide complex catalyst;

The curable composition in which the backbone chain of the oxyalkylene polymer (A) is substantially a linear polymer;

The curable composition in which the reactive silicon group of the oxyalkylene polymer (A) comprises one silicon atom and two hydrolyzable groups bonded to the silicon atom;

The curable composition in which the reactive silicon group of the oxyalkylene polymer (A) is a dimethoxymethylsilyl group;

The curable composition in which the reactive silicon group is present at a terminus of the molecular chain of the oxypropylene polymer (A);

The curable composition in which the vinyl polymer (B) contains a monomeric unit derived from an alkyl acrylate and/or alkyl methacrylate;

The curable composition in which the vinyl polymer (B) contains 70% by weight or more of the monomeric unit derived from the alkyl acrylate and/or alkyl methacrylate;

The curable composition in which the vinyl polymer (B) has a number-average molecular weight of 5,000 to 30,000;

The curable composition in which the vinyl polymer (B) has a number-average molecular weight of 10,000 to 20,000.

The curable composition in which the oxyalkylene polymer (A) and the vinyl polymer (B) are synthesized separately;

The curable composition in which the vinyl polymer (B) is prepared by polymerization in the presence of the oxyalkylene polymeric plasticizer (C), and the oxyalkylene polymeric plasticizer (C) used during the polymerization is partially or entirely used as a plasticizer of the curable composition;

The curable composition in which the ratio, by weight, of the oxyalkylene polymer (A) to the vinyl polymer (B) is 90/10 to 10/90;

The curable composition in which the oxyalkylene polymeric plasticizer (C) has a number-average molecular weight of 500 to 15,000;

The curable composition in which the oxyalkylene polymeric plasticizer (C) has a number-average molecular weight of 1,000 to 8,000;

The curable composition in which the amount of the oxyalkylene polymeric plasticizer (C) used is 5 to 150 parts by weight based on 100 parts by weight of the total amount of the oxyalkylene polymer (A) and the vinyl polymer (B).

The curable composition in which the amount of the oxyalkylene polymeric plasticizer (C) used is 10 to 120 parts by weight based on 100 parts by weight of the total amount of the oxyalkylene polymer (A) and the vinyl polymer (B);

The curable composition in which the amount of the oxyalkylene polymeric plasticizer (C) used is 20 to 100 parts by weight based on 100 parts by weight of the total amount of the oxyalkylene polymer (A) and the vinyl polymer (B);

The curable composition further comprising a second plasticizer in addition to the oxyalkylene polymeric plasticizer (C);

The curable composition in which the ratio, by weight, of the oxyalkylene polymeric plasticizer (C) to the second plasticizer is 90/10 to 10/90;

The curable composition further comprising a flaky or granular material with a diameter of 0.1 mm or more;

The curable composition further comprising balloons;

The curable composition in which the balloons have a particle size of 0.1 mm or more;

The curable composition used as a sealant for joints of siding boards;

The curable composition used as a sealant for joints of ceramic siding boards; and A method for sealing ceramic siding boards comprising applying the curable composition as a sealant to the siding boards, and curing the curable composition.

In the composition of the present invention, since the reactive silicon group-containing oxyalkylene polymer (A) has a number-average molecular weight of 16,000 or more, the resultant cured object has large elongation at break. Furthermore, the composition of the present invention has an advantage in that, because of the use of the oxyalkylene polymeric plasticizer (C), the elongation properties at break of the resulting cured object are equal to or superior to those of the cured object prepared using a low molecular weight plasticizer, such as dioctyl phthalate or diisodecyl phthalate. This advantage, coupled with the effect of enhancing elongation properties at break by increasing the molecular weight of the oxyalkylene polymer (A), is very useful for sealants, in particular, for sealants used for siding boards.

The main chain of the oxyalkylene polymer (A) essentially has a repeating unit represented by —R—O—  (Chemical Formula 1)

(wherein R is a divalent organic group, and preferably a linear or branched alkylene group having 1 to 14 carbon atoms). Such a polymer has a relatively low glass transition temperature, and the resulting cured object has excellent low-temperature resistance, thus being preferable. R in Chemical Formula 1 is preferably a linear or branched alkylene group having 1 to 14 carbon atoms, more preferably 2 to 4 carbon atoms. Specific examples of the repeating unit represented by Chemical Formula 1 include the followings:

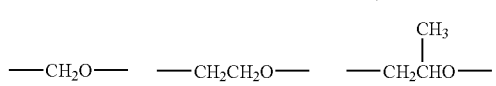

(Chemical Formula 2)

-continued

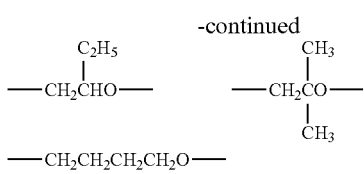

The backbone chain of the oxyalkylene polymer may comprise only one type of repeating unit or two or more types of repeating units. Examples thereof include polyethylene oxide (polyoxyethylene), polypropylene oxide (polyoxypropylene), polybutylene oxide (polyoxybutylene), polytetramethylene oxide (polyoxytetramethylene), ethylene oxide-propylene oxide copolymers, and propylene oxide-butylene oxide copolymers. Particularly, when the curable composition is used for sealants, adhesives, or the like, a propylene oxide polymer (polypropylene oxide), in particular, a polymer containing propylene oxide as the principal component with 80% by weight or more, preferably 90% by weight or more, of propylene oxide unit, is preferred from the standpoints of being amorphous and relatively low viscosity.

Examples of the method for synthesizing the oxyalkylene polymer include, but are not limited to, a polymerization method using an alkali catalyst, such as KOH; a polymerization method using a transition metal compound-porphyrin complex catalyst, for example, a complex obtained by reaction of an organoaluminum compound with porphyrin as disclosed in Japanese Unexamined Patent Application Publication No. 61-215623; a polymerization method using a double metal cyanide complex catalyst, for example, as disclosed in Japanese Examined Patent Application Publication No. 46-27250 or 59-15336, or U.S. Pat. Nos. 3,278,457, 3,278,458, 3,278,459, 3,427,256, 3,427,334, or 3,427,335; and a polymerization method using phosphazene as disclosed in Japanese Unexamined Patent Application Publication No. 11-60723. Among these, a polymerization method using a double metal cyanide complex catalyst is preferable. Because of production cost, etc., a polyoxyalkylene, such as polyoxypropylene, with a number-average molecular weight of 10,000 or more is preferably produced using a double metal cyanide complex catalyst.

The reactive silicon group of the reactive silicon group-containing oxyalkylene polymer (A) contains a hydroxyl group or hydrolyzable group bonded to a silicon atom, and is crosslinkable by formation of a siloxane bond. An example thereof is a group represented by

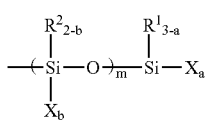

(Chemical Formula 3)

(wherein $R^1$ and $R^2$ each represent an alkyl group having 1 to 20 carbon atoms, an aryl group having 6 to 20 carbon atoms, an aralkyl group having 7 to 20 carbon atoms, or a triorganosiloxy group represented by $R'_3SiO$— (wherein R' represents a monovalent hydrocarbon group having 1 to 20 carbon atoms, and three R's may be the same or different); when there are two or more of each of $R^1$s and $R^2$s, each of $R^1$s and $R^2$s may be the same or different; X represents a hydroxyl group or a hydrolyzable group, and when there are two or more Xs, they may be the same or different; a represents 0, 1, 2, or 3; b represents 0, 1, or 2; m is an integer of 0 to 19; bs in m groups, each group being represented by

(Chemical Formula 4)

may be the same or different; and a+(sum of bs)≧1).

The hydrolyzable group represented by X is not particularly limited and may be any known hydrolyzable group. Specific examples thereof include a hydrogen atom, a halogen atom, an alkoxy group, an acyloxy group, a ketoximate group, an amino group, an amido group, an acid amide group, an aminooxy group, a mercapto group, and an alkenyloxy group. Among these, a hydrogen atom, an alkoxy group, an acyloxy group, a ketoximate group, an amino group, an amido group, an aminooxy group, a mercapto group, and an alkenyloxy group are preferred, and from the standpoints of mild hydrolyzability and ease of handling, an alkoxy group is particularly preferred.

One to three hydrolyzable groups or hydroxyl groups can be bonded to one silicon atom, and [a+(sum of bs)] is preferably in a range of 1 to 5. When two or more of each of hydrolyzable groups and hydroxyl groups are bonded in the reactive silicon group, each of hydrolyzable groups and hydroxyl groups may be the same or different.

The number of silicon atoms constituting the reactive silicon group may be one or may be two or more, and when silicon atoms are linked by siloxane bonding or the like, the number of silicon atoms may be about 20. Furthermore, a reactive silicon group represented by

(Chemical Formula 5)

(wherein $R^1$ and X are the same as above, and a is an integer of 1, 2, or 3) is preferable because of ease in availability.

Specific examples of each of $R^1$ and $R^2$ in Chemical Formulae 3, 4, and 5 include alkyl groups, such as a methyl group and an ethyl group; cycloalkyl groups, such as a cyclohexyl group; aryl groups, such as a phenyl group; aralkyl groups, such as a benzyl group; and a triorganosiloxy group represented by $R'_3SiO$— in which R' is a methyl group, a phenyl group, or the like. Among these, a methyl group is particularly preferable.

More specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group.

As the number of hydrolyzable groups bonded to silicon atoms, in particular, the same silicon atom, increases, the reactivity of the reactive silicon group increases, and the curing rate of the composition of the present invention tends to increase. However, the elongation at break of the resulting cured object may decrease in some cases. For example, a trimethoxysilyl group has greater reactivity than a dimethoxymethylsilyl group, and a trimethoxysilyl group-containing polymer has greater reactivity and higher curing rate compared with a dimethoxymethylsilyl group-containing polymer. However, the elongation at break of the cured object tends to decrease. It is possible to obtain a curable composition having high curing rate by using a trimethoxysilyl group-containing oxyalkylene polymer as the oxyalkylene polymer (A) or by using a trimethoxysilyl group-containing oxyalkylene polymer and a dimethoxymethylsilyl group-containing polymer together. It is also possible to obtain a curable composition having high curing rate by introducing both groups into the same polymer. The amount of the highly reactive polymer, such as a trimethoxysilyl group-containing polymer, the ratio between both groups in the same polymer, etc., are appropriately set so that desired elongation at break of the cured object or curing rate can be obtained.

The reactive silicon group may be introduced by any known method. Namely, an organic polymer having a functional group, such as a hydroxyl group, an unsaturated group, e.g., a vinyl group, an epoxy group, or an isocyanato group, in its molecule is allowed to react with a compound having both a functional group showing reactivity toward the functional group of the organic polymer and a reactive silicon group. Examples of the method include the followings:

In method (a), an organic polymer having a functional group, such as a hydroxyl group, in its molecule is allowed to react with an organic compound having both an active group showing reactivity toward the functional group and an unsaturated group to prepare an unsaturated group-containing organic polymer. Alternatively, an unsaturated group-containing organic polymer is prepared by copolymerization with an unsaturated group-containing epoxy compound. The resulting reaction product is hydrosilylated with a reactive silicon group-containing hydrosilane. More particularly, in a method, a hydroxyl group-terminated oxyalkylene polymer prepared using a double metal cyanide complex catalyst, such as zinc hexacyanocobaltate, is subjected to alkoxidation, and then the resulting product is allowed to react with allyl chloride to produce an allyloxy ($CH_2$=$CHCH_2O$—) group-terminated oxyalkylene polymer, followed by hydrosilylation with a silane compound, such as dimethoxymethylsilane. In another method, a hydroxyl group-terminated oxyalkylene polymer is subjected to alkoxidation, and then the resulting product is allowed to react with methallyl chloride to produce a methallyloxy group-terminated oxyalkylene polymer, followed by hydrosilylation with a silane compound, such as dimethoxymethylsilane. Use of a methallyloxy ($CH_2$=$C(CH_3)CH_2O$—) group-terminated oxyalkylene polymer enables production of a polymer having a higher silylation rate compared with use of an allyloxy group-terminated polymer, and therefore, a curable composition containing this polymer can provide a cured object having large mechanical strength. A polymer having the reactive silicon group derived from a methallyloxy group-terminated oxyalkylene polymer and a polymer having the reactive silicon group derived from an allyloxy group-terminated oxyalkylene polymer can be mixed for use. The polymer (A) prepared by hydrosilylation of an allyloxy group-terminated or methallyloxy group-terminated oxyalkylene polymer has an ether bond at the terminus, and the composition has lower viscosity compared with the polymer having a urethane bond or the like, which is desirable.

In method (b), an unsaturated group-containing organic polymer prepared as in method (a) is allowed to react with a compound having a mercapto group and a reactive silicon group.

In method (c), an organic polymer having a functional group, such as a hydroxyl group, an epoxy group, or an isocyanato group, in its molecule is allowed to react with a compound having both a functional group showing reactivity toward the functional group of the organic polymer and a reactive silicon group.

Among the methods described above, a method in which a reactive silicon group-containing compound is allowed to react with the terminus of an organic polymer is preferred.

The reactive silicon group-containing oxyalkylene polymer (A) may be linear or branched. Under the same molecular weight, if a linear polymer is used, the resulting cured object has higher elongation at break compared with the use of a branched polymer, but the viscosity of the composition before curing tends to increase, causing difficulty in handling. The lower limit of the number-average molecular weight of the reactive silicon group-containing oxyalkylene polymer (A) is 16,000. The upper limit is preferably 50,000, more preferably 30,000, and still more preferably 25,000. If the number-average molecular weight is less than 16,000, the resulting cured object of the reactive silicon group-containing oxyalkylene polymer (A) has insufficient elongation properties at break. If the number-average molecular weight exceeds 50,000, the functional group concentration becomes too low, the curing rate decreases, and also the viscosity of the polymer becomes too high, causing difficulty in handling. Furthermore, the number-average molecular weight is particularly preferably 16,000 to 30,000 in view of the viscosity of the resulting reactive silicon group-containing oxyalkylene polymer.

Elongation at break of the resulting cured object can be efficiently improved by increasing the molecular weight of the reactive silicon group-containing oxyalkylene polymer (A) rather than by increasing the molecular weight of the reactive silicon group-containing vinyl polymer (B). In general, under the same type of reactive silicon group and the same amount of reactive silicon group per molecule of the polymer, if the molecular weight of the polymer is increased, since the density of the reactive silicon group decreases, it is expected that the reaction rate of the reactive silicon group decreases and the curing rate of the curable composition decreases. However, in the composition of the present invention, even if the number-average molecular weight of the reactive silicon group-containing oxyalkylene polymer (A) is set at 16,000 or more, the curing rate does not substantially decrease.

Furthermore, if the molecular weight of the reactive silicon group-containing oxyalkylene polymer (A) is increased, since the number of crosslinking points decreases, weatherability tends to decrease. However, in the composition of the present invention, a decrease in weatherability is not substantially observed by testing with a sunshine weathermeter, which is also advantageous. In view of elongation at break, the number-average molecular weight of the reactive silicon group-containing oxyalkylene polymer (A) is preferably 17,000 or more, more preferably 18,000 or more, and particularly preferably 19,000 or more. The upper limit of the molecular weight is preferably 25,000, more preferably 23,000, and particularly preferably 22,000 in view of viscosity of the composition.

When the number-average molecular weight of the oxyalkylene polymer (A) is set at 16,000 or more so that elongation at break of the resulting cured object can be improved, in order to obtain sufficient elongation at break, the oxyalkylene polymer is preferably a linear polymer with substantially no branches. Furthermore, the reactive silicon group of the oxyalkylene polymer (A) is preferably a group comprising one silicon atom and two hydrolyzable groups bonded to the silicon atom, for example, a dimethoxymethylsilyl group. Desirably, the oxyalkylene polymer (A) contains a group comprising one silicon atom and two hydrolyzable groups bonded to the silicon atom, for example, a dimethoxymethylsilyl group, in an amount of 50% or more, preferably 70% or more, more preferably 80% or more, and particularly preferably 90% or more. The number-average molecular weight of the reactive silicon group-containing oxyalkylene polymer (A) is defined as described below.

The number-average molecular weight is defined as the molecular weight corresponding to the number-average molecular weight (terminal group-based molecular weight) found by directly determining the terminal group concentrations by the method for determination of hydroxyl values according to JIS K1557 and titrimetry based on the principle of the method for determination of iodine values according to JIS K0070, taking a structure of the polyether oligomer (which depends on the number of termini and the polymerization initiator used) into consideration. The number-average molecular weight can also be determined by a relative measurement method in which a calibration curve is formed between the polystyrene-equivalent molecular weight determined by standard GPC and the terminal group-based molecular weight described above, and the GPC molecular weight is converted into the terminal group-based molecular weight. In the case of a polymer containing a functional group other than a hydroxyl group or an unsaturated group, the relative measurement method can be used for determination.

When the molecular weight of the polymer before introduction of the reactive silicon group, such as an unsaturated group-containing polyoxyalkylene, and the molecular weight of the polymer after introduction of the reactive silicon group are compared, the polymer after introduction of the reactive silicon group usually tends to have a slightly larger molecular weight. However, unless the curing reaction of the polymer (A) proceeds, the difference in the molecular weight is small.

The average number of reactive silicon groups per molecule of the oxyalkylene polymer (A) used in the present invention is at least 1, and preferably 1.1 to 5. In the case of substantially the linear polymer, the average number of reactive silicon groups is preferably 1.2 to 1.6. If the average number of reactive silicon groups in the molecule is less than 1, curability becomes insufficient. If the average number of reactive silicon groups is too large, the network structure becomes excessively dense, and thus satisfactory mechanical properties are not exhibited.

The reactive silicon group of the oxyalkylene polymer (A) used in the present invention may be present in the polyether chain as a side chain or at a terminus. If the reactive silicon group is present as the side chain, the amount of effective network chain contained in the resulting cured object decreases, and thereby it becomes possible to easily obtain a rubber-like cured object having high modulus of elasticity and low elongation at break. On the other hand, if the reactive silicon group is present in the vicinity of the terminus of the chain, the amount of effective network chain contained in the resulting cured object increases, and thereby it becomes possible to easily obtain a rubber-like cured object having high strength, high elongation at break, and low modulus of elasticity. In particular, if the reactive silicon group is present at the terminus of the chain, the amount of effective network chain contained in the resulting cured object increases most, and thereby the resulting composition is suitable for use as a sealant for construction which is desired to have large elongation at break as tensile physical properties and high flexibility, i.e., rubber elasticity.

Examples of methods for introducing a reactive silicon group into an oxyalkylene polymer include methods proposed in Japanese Examined Patent Application Publication Nos. 45-36319 and 46-12154, Japanese Unexamined Patent Application Publication Nos. 50-156599, 54-6096, 55-13767, 55-13468, and 57-164123, Japanese Examined Patent Application Publication No. 3-2450, U.S. Pat. Nos. 3,632,557, 4,345,053, 4,366,307, and 4,960,844; methods proposed in Japanese Unexamined Patent Application Publication Nos. 61-197631, 61-215622, 61-215623, and 61-218632, each method comprising subjecting an oxyalkylene polymer having high molecular weight and narrow molecular weight distribution, i.e., with a number-average molecular weight of 6,000 or more and a molecular weight distribution (Mw/Mn) of 1.6 or less, to hydrosilylation or the like to introduce a reactive silicon group, such as a dimethoxymethylsilyl group; and a method proposed in Japanese Unexamined Patent Application Publication No. 3-72527.

The reactive silicon group-containing vinyl polymer (B) contributes greatly to an increase in viscosity of the resulting composition and tends to decrease workability. However, by using, as the reactive silicon group-containing oxypropylene polymer (A), an oxypropylene polymer prepared in the presence of a double metal cyanide complex catalyst, an increase in viscosity of the resulting composition can be reduced and workability can be improved. By using a double metal cyanide complex catalyst, it is possible to obtain a polymer having a molecular weight distribution (Mw/Mn) of 1.6 or less, and preferably 1.5 or less. Even if an oxypropylene polymer prepared using a double metal cyanide complex catalyst is used as the reactive silicon group-containing oxypropylene polymer (A), if a linear polymer having a number-average molecular weight of 16,000 or more is used and a polymer obtained by radical polymerization other than living radical polymerization, such as a (meth)acrylic random copolymer, as the reactive silicon group-containing vinyl polymer (B), it is expected that the viscosity of the resulting composition will increase greatly. However, the viscosity is about 100 Pa·s or 80 Pa·s, which is within a range that can be used in a composition for sealants. Consequently, it is not necessary to use special formulation, such as use of a solvent for decreasing the viscosity or an excessive amount of plasticizer, and if used, the amount used can be decreased.

In the present invention, the reactive silicon group-containing vinyl polymer (B) is used together with the polymer (A). Examples of the method for blending the reactive silicon group-containing vinyl polymer (B) and the reactive silicon group-containing oxyalkylene polymer (A) include, but are not limited to, methods specifically disclosed in Japanese Unexamined Patent Application Publication Nos. 59-122541, 63-112642, 6-172631, 60-228517, etc.

Examples of the monomer used for the vinyl polymer (B) of the present invention include acrylates and methacrylates (hereinafter also referred to as "(meth)acrylates"), such as methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, and benzyl methacrylate; amide compounds, such as acrylamide, methacrylamide, N-methylolacrylamide, and N-methylolmethacrylamide; epoxy compounds, such as glycidyl acrylate and glycidyl methacrylate; amino compounds, such as diethylaminoethyl acrylate, diethylaminoethyl methacrylate, and aminoethyl vinyl ether; and other compounds, such as acrylonitrile, styrene, α-methylstyrene, alkyl vinyl ethers, vinyl chloride, vinyl acetate, vinyl propionate, and ethylene.

In particular, when the resulting cured object is required to have rubber elasticity and weatherability, desirably, the vinyl polymer (B) contains a (meth)acrylate, in particular, an alkyl (meth)acrylate, in an amount of 50% by weight or more, preferably 70% by weight or more, particularly preferably 80% by weight or more, and most preferably 85% by weight or more or 90% by weight or more.

In view of compatibility with the reactive silicon group-containing oxypropylene polymer (A), desirably, the alkyl (meth)acrylate partially comprises an acrylate monomer and/or methacrylate monomer (hereinafter also referred to as a "(meth)acrylate monomer") derived form an alcohol having 9 or more carbon atoms, preferably 10 or more carbon atoms (in an amount of 5% to 60% by weight, and preferably 10% to 40% by weight, of the alkyl (meth) acrylate). It is not always necessary to use the (meth)acrylate monomer derived from an alcohol having 9 or more carbon atoms. It is also possible to use a (meth)acrylate monomer not derived from an alcohol having 9 or more carbon atoms, such as butyl acrylate, or a combined system of butyl acrylate and ethyl acrylate.

Preferably, the vinyl polymer (B) has a number-average molecular weight of 500 to 100,000 in view of ease of handling, more preferably 3,000 to 30,000, and particularly preferably 5,000 to 20,000. In particular, in the present invention, the vinyl polymer (B) with a number-average molecular weight of 10,000 to 20,000 is more preferred from the standpoints that elongation properties of the resulting cured object are improved and good weatherability and workability are exhibited. Although elongation properties tend to decrease slightly, it is also possible to set the number-average molecular weight at 5,000 to 12,000, and further at 7,000 to 10,000, in order to further improve workability while maintaining elongation properties at the same level as that of a polymer having a number-average molecular weight of 10,000 to 20,000. The number-average molecular weight of the vinyl polymer (B) is determined in terms of polystyrene by GPC. As the reactive silicon group contained in the vinyl polymer (B), any one of the reactive silicon groups described above can be used, and preferred examples of the reactive silicon group, etc. are the same as those described above. The number of reactive silicon groups per molecule of the vinyl polymer (B) is preferably 1.1 to 5. It is possible to increase the curing rate of the composition by introducing a reactive silicon group having high reactivity, such as a trimethoxysilyl group, into a vinyl polymer. The details thereof have already been described above. It is easy to introduce a functional group having high reactivity, such as a trimethoxysilyl group, into a vinyl polymer, which is preferable. A method for introducing a reactive silicon group into the vinyl polymer (B) is described in Japanese Unexamined Patent Application Publication No. 63-112642 or the like.

The backbone chain of the vinyl polymer (B) is usually produced by ordinary radical polymerization using a radical initiator, and can also be produced by living radical polymerization or the like as disclosed in Japanese Unexamined Patent Application Publication No. 2000-178456. In ordinary radical polymerization, at a number-average molecular weight of 10,000 or more, a polymer with a molecular weight distribution (Mw/Mn) of 1.8 or more is usually obtained, and in living radical polymerization, a polymer with a molecular weight distribution (Mw/Mn) of less than 1.8, or further 1.7 or less or 1.6 or less, is obtained. The molecular weight distribution (Mw/Mn) can be determined by GPC (polystyrene equivalent).

With respect to a curable composition containing a vinyl polymer having broad molecular weight distribution produced by ordinary radical polymerization, typically using an azo or peroxy radical initiator, along with the reactive silicon group-containing oxyalkylene polymer (A), although viscosity increases and workability decreases compared with a curable composition containing only the reactive silicon group-containing oxyalkylene polymer (A), the viscosity is in a range usable in sealants. Among the reactive silicon group-containing vinyl polymers, a reactive silicon group-containing (meth)acrylic polymer is preferred. When such a polymer is produced by ordinary radical polymerization, preferably, a random copolymer is produced using an alkyl (meth)acrylate monomer having an alkyl group of 9 or more carbon atoms, preferably 10 or more carbon atoms, an alkyl (meth)acrylate monomer having an alkyl group of 1 to 8 carbon atoms, and a reactive silicon group-containing acrylic and/or methacrylic monomer. Furthermore, preferably, without using an alkyl (meth)acrylate monomer having an alkyl group of 9 or more carbon atoms, a random copolymer is produced using an alkyl (meth)acrylate monomer having an alkyl group of 1 to 8 carbon atoms and a reactive silicon group-containing acrylic and/or methacrylic monomer. These copolymers may, of course, contain other monomeric units. Furthermore, as the reactive silicon group-containing random copolymer, an acrylic and/or methacrylic random copolymer may be produced by a method in which a random copolymer is produced by the same polymerization method using an acrylic and/or methacrylic monomer containing a functional group, such as a hydroxyl group, as a part of an acrylic and/or methacrylic monomer, and a reactive silicon group is introduced using the functional group.

With respect to the ratio (A)/(B) (by weight) of the reactive silicon group-containing oxyalkylene polymer (A) to the reactive silicon group-containing vinyl polymer (B), the upper limit is preferably 90/10, more preferably 80/20, still more preferably 75/25, and particularly preferably 70/30. The lower limit is preferably 10/90, more preferably 25/75, and still more preferably 30/70. Any one of 12 combinations of the upper limit and lower limit can be used, and a narrower range is preferable. If the ratio exceeds 90/10 and the amount of the reactive silicon group-containing oxyalkylene polymer (A) increases, weatherability may become insufficient for modified silicone sealants in some cases. On the other hand, if the ratio is lower than 10/90 and the amount of the reactive silicon group-containing vinyl polymer (B) increases, weatherability improves, but the viscosity of the composition increases, which may result in poor workability of the composition.

When a reactive silicon group-containing alkyl acrylate polymer and/or alkyl methacrylate polymer is used as the reactive silicon group-containing vinyl polymer (B) and a reactive silicon group-containing oxypropylene polymer is used as the reactive silicon group-containing oxyalkylene polymer (A), in addition to the ranges between upper and lower limits described above, the ratio (A)/(B) (by weight) is preferably in a range of 75/25 to 55/45. In particular, when a reactive silicon group-containing oxypropylene polymer having a number-average molecular weight of 16,000 or more, in particular, 18,000 or more, and a molecular weight distribution Mw/Mn of 1.5 or less is used, in addition to the ranges between the upper and lower limits described above, the ratio (A)/(B) (by weight) is preferably in a range of 75/25 to 55/45. If the ratio (A)/(B) is in a range of 75/25 to 55/45, both weatherability and workability can be obtained more satisfactorily. The ratio (A)/(B) is more preferably in a range of 70/30 to 55/45.

Examples of the method for blending the reactive silicon group-containing oxyalkylene polymer (A) and the reactive silicon group-containing vinyl polymer (B) include a method in which two types of polymers are simply synthesized separately and mixed; a method in which vinyl monomers are subjected to polymerization in the presence of the reactive silicon group-containing oxyalkylene polymer (A); and methods described in Japanese Unexamined Patent Application Publication Nos. 59-78223, 60-228516, and 60-228517. In particular, when a reactive silicon group-containing oxypropylene polymer (A) is used, a method in which two types of polymers are synthesized separately and mixed is preferable in view of weatherability. Furthermore, a method in which the vinyl polymer (B) is polymerized in the presence of the oxyalkylene polymeric plasticizer (C) is preferable because tensile elongation properties are further improved. In such a case, the oxyalkylene polymeric plasticizer (C) used during the polymerization is partially or entirely used as a plasticizer of the curable composition of the present invention.

Examples of the oxyalkylene polymeric plasticizer (C) having a smaller molecular weight than that of the polymer (A) used in the present invention include polyoxyethylene, polyoxypropylene, polyoxybutylene, polyoxytetramethylene, polyoxyethylene-polyoxypropylene copolymers, and polyoxypropylene-polyoxybutylene copolymers. Among these, polyoxypropylene is preferred.

The oxyalkylene polymeric plasticizer (C) functions as a plasticizer for the reactive silicon group-containing oxyalkylene polymer (A), and the molecular weight of the oxyalkylene polymeric plasticizer (C) must be smaller than that of the oxyalkylene polymer (A). The lower limit is preferably 500, more preferably 800, and still more preferably 1,000. The upper limit is preferably 15,000, more preferably 10,000, still more preferably 8,000, and particularly preferably 5,000. Any one of 12 combinations of the upper limit and lower limit can be used, and a narrower range is preferable. In order to further improve elongation properties, the molecular weight is preferably 5,000 or less, more preferably 4,000 or less, still more preferably 500 to 5,000, and particularly preferably 800 to 5,000. If the molecular weight is too low, bleeding of the plasticizer occurs with time due to heat and rainfall, and thereby it is likely that the original physical properties cannot be maintained for a long period of time and weatherability also cannot be improved. If the molecular weight is too high, viscosity increases, and workability tends to decrease. The number-average molecular weight is defined as the molecular weight corresponding to the number-average molecular weight obtained by terminal group-based analysis, as in the molecular weight of the oxyalkylene polymer (A).

Lower molecular weight distribution indicates lower viscosity, which is preferable. A polymer with a molecular weight distribution (Mw/Mn) of 1.6 or less, and further 1.5 or less, can be used. The molecular weight distribution (Mw/Mn) is determined by GPC (polystyrene equivalent).

As the component (C), an oxyalkylene polymer produced by conventional polymerization using caustic alkali may be used. Alternatively, an oxyalkylene polymer produced by polymerization using a double metal cyanide complex, such as zinc hexacyanocobaltate, as a catalyst may be used.

As the oxyalkylene polymer used as the component (C), a hydroxyl group-terminated polymer may be used. Furthermore, in order to improve tackiness of the surface of the resulting cured object or to improve paintability of the surface of the resulting cured object with respect to alkyd paint, a polymer which is terminated with an allyl group or the like, as described in Japanese Unexamined Patent Application Publication No. 1-279958, may also be used. Although a polymer not containing a reactive silicon group can be used as the component (C), a reactive silicon group may be introduced. In such a case, a reactive plasticizer is produced and bleeding of the plasticizer, etc., can be prevented. The number of reactive silicon groups introduced per molecule of the polymer is preferably less than 1.

With respect to the amount of the plasticizer (C) used, the lower limit is preferably 5 parts by weight, more preferably 10 parts by weight, and still more preferably 20 parts by weight, based on 100 parts by weight of the total amount of the reactive silicon group-containing oxyalkylene polymer (A) and the reactive silicon group-containing vinyl polymer (B), and the upper limit is preferably 150 parts by weight, more preferably 120 parts by weight, and still more preferably 100 parts by weight. If the amount is less than 5 parts by weight, the effect of the plasticizer is not easily shown. If the amount exceeds 150 parts by weight, mechanical strength of the resulting cured object tends to be insufficient. Additionally, the plasticizer may be compounded during the production of the polymer.

The composition of the present invention can be cured either in the presence of or in the absence of a curing catalyst. When a curing catalyst is used, any catalyst selected from a wide variety of known catalysts can be used. Specific examples thereof include titanium compounds, such as tetrabutyl titanate, tetrapropyl titanate, and titanium tetraacetylacetonate; tetravalent tin compounds, such as dibutyltin dilaurate, dibutyltin maleate, dibutyltin phthalate, dibutyltin dioctoate, dibutyltin diethylhexanoate, dibutyltin dimethylmaleate, dibutyltin diethylmaleate, dibutyltin dibutylmaleate, dibutyltin dioctylmaleate, dibutyltin ditridecylmaleate, dibutyltin dibenzylmaleate, dibutyltin diacetate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, and reaction products between dibutyltin oxide and phthalic esters; divalent tin compounds, such as tin octylate, tin naphthenate, tin stearate, and tin versatate; organoaluminum compounds, such as aluminum trisacetylacetonate, aluminum trisethylacetoacetate, and diisopropoxyaluminum ethylacetoacetate; zirconium compounds, such as zirconium tetraacetylacetonate; lead octylate; amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU), or salts of these amine compounds with carboxylic acid or the like; low molecular weight polyamide resins obtained from excess polyamines and polybasic acids; reaction products of excess polyamines with epoxy compounds; silanol condensation catalysts, e.g., amino group-containing silane coupling agents, such as γ-aminopropyltrimethoxysilane and N-(β-aminoethyl)-γ-aminopropylmethyldimethoxysilane; and other known silanol condensation catalysts, such as acidic catalysts and basic catalysts. These catalysts may be used alone or in combination.

The curing catalyst is used in an amount of preferably about 0.1 to 20 parts by weight, more preferably about 1 to 10 parts by weight, based on 100 parts by weight of the total amount of the reactive silicon group-containing oxyalkylene polymer (A) and the reactive silicon group-containing vinyl polymer (B). If the amount of the curing catalyst used is too small, the curing rate decreases, and the curing reaction does not sufficiently proceed, which is disadvantageous. On the other hand, if the amount of the curing catalyst used is too large, heat generation or foaming occurs locally during curing, and it becomes difficult to obtain satisfactory cured objects, which is disadvantageous.

In the curable composition of the present invention, in order to further enhance the activity of the condensation catalyst, a silicon compound represented by the general formula $R_aSi(OR)_{4-a}$ (wherein each R independently represents a substituted or unsubstituted hydrocarbon group having 1 to 20 carbon atoms, and a is any one of 0, 1, 2, and 3) may be incorporated. Although the silicon compound is not particularly limited, a silicon compound represented by the general formula in which R represents an aryl group having 6 to 20 carbon atoms is preferable because of its high effect of accelerating the curing reaction of the composition. Examples thereof include phenyltrimethoxysilane, phenylmethyldimethoxysilane, phenyldimethylmethoxysilane, diphenyldimethoxysilane, diphenyldiethoxysilane, and triphenylmethoxysilane. Among these, diphenyldimethoxysilane and diphenyldiethoxysilane are particularly preferable because of low cost and ease of availability. The amount of the silicon compound used is preferably about 0.01 to 20 parts by weight, more preferably 0.1 to 10 parts by weight, based on 100 parts by weight of the total amount of the reactive silicon group-containing oxyalkylene polymer (A) and the reactive silicon group-containing vinyl polymer (B). If the amount of the silicon compound used is below such a range, the effect of accelerating the curing reaction may be decreased. On the other hand, if the amount of the silicon compound used is above such a range, the hardness or tensile strength of the resulting cured object may be decreased.

In the composition of the present invention, a silane coupling agent, a reaction product of a silane coupling agent, or a compound other than a silane coupling agent may be incorporated as an adhesion-imparting agent. Specific examples of the silane coupling agent include isocyanato group-containing silanes, such as γ-isocyanatopropyltrimethoxysilane, γ-isocyanatopropyltriethoxysilane, γ-isocyanatopropylmethyldiethoxysilane, and γ-isocyanatopropylmethyldimethoxysilane; amino group-containing silanes, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes, such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes, such as γ-glycidoxypropyltrimethoxysilane, γ-glycidoxypropyltriethoxysilane, γ-glycidoxypropylmethyldimethoxysilane, 2-(3,4-epoxycyclohexyl)ethyltrimethoxysilane, and 2-(3,4-epoxycyclohexyl)ethyltriethoxysilane; carboxysilanes such as β-carboxyethyltriethoxysilane, β-carboxyethylphenylbis(2-methoxyethoxy)silane, and N-(carboxymethyl)-β-aminoethyl-γ-aminopropyltrimethoxysilane; vinyl unsaturated group-containing silanes, such as vinyltrimethoxysilane, vinyltriethoxysilane, γ-methacryloyloxypropylmethyldimethoxysilane, and γ-acryloyloxypropyltriethoxysilane; halogen-containing silanes, such as γ-chloropropyltrimethoxysilane; and isocyanurate silanes, such as tris(trimethoxysilyl) isocyanurate. Also usable as the silane coupling agent are modification derivatives of these, for example, amino-modified silyl polymers, silylated amino polymers, unsaturated amino silane complexes, phenylamino-long chain alkylsilanes, aminosilylated silicones, and silylated polyesters. In the present invention, the silane coupling agent is used usually in an amount of 0.1 to 20 parts by weight based on 100 parts by weight of the total amount of the reactive silicon group-containing oxyalkylene polymer (A) and the reactive silicon group-containing vinyl polymer (B). In particular, use in an amount of 0.5 to 10 parts by weight is preferable.

With respect to the effect of the silane coupling agent incorporated into the curable composition of the present invention, remarkable adhesion-improving effects are shown under non-primer or primer-treated conditions when the composition is applied to various adherends, for example, inorganic bases, such as glass, aluminum, stainless steel, zinc, copper, and mortar, and organic bases, such as polyvinyl chloride, acrylics, polyesters, polyethylenes, polypropylenes, and polycarbonates. When the composition is used under non-primer conditions, the effects of improving adhesion to various adherends are particularly remarkable. Specific examples of the adhesion-imparting agent other than the silane coupling agent include, but are not limited to, epoxy resins, phenol resins, sulfur, alkyl titanates, and aromatic polyisocyanates. The adhesion-imparting agents described above may be used alone or in combination. By adding these adhesion-imparting agents to the composition, it is possible to improve adhesion to adherends.

Various fillers may be compounded with the curable composition of the present invention. Examples of fillers include reinforcing fillers, such as fumed silica, precipitated silica, crystalline silica, fused silica, dolomite, silicic acid anhydride, silicic acid hydrate, and carbon black; fillers, such as ground calcium carbonate, precipitated calcium carbonate, magnesium carbonate, diatomaceous earth, calcined clay, clay, talc, titanium oxide, bentonite, organic bentonite, ferric oxide, fine aluminum powder, flint powder, zinc oxide, active zinc white, Shirasu balloons, glass microballoons, organic microballoons composed of phenolic resins and vinylidene chloride resins, and powdered resins, e.g., powdered PVC and powdered PMMA; and fibrous fillers, such as asbestos, glass fibers, and filaments. The filler is used in an amount of 1 to 300 parts by weight, preferably 10 to 200 parts by weight, based on 100 parts by weight of the total amount of the reactive silicon group-containing oxyalkylene polymer (A) and the reactive silicon group-containing vinyl polymer (B).

When a cured object with high strength is desired to be obtained, a filler selected from the group mainly consisting of fumed silica, precipitated silica, crystalline silica, fused silica, dolomite, silicic acid anhydride, silicic acid hydrate, carbon black, surface-treated fine calcium carbonate, calcined clay, clay, and active zinc white is preferably used. By using such a filler in an amount of 1 to 200 parts by weight based on 100 parts by weight of the total amount of the reactive silicon group-containing oxyalkylene polymer (A) and the reactive silicon group-containing vinyl polymer (B), favorable results are obtained. When a cured object with low strength and high elongation at break is desired to be obtained, by using a filler selected from the group mainly consisting of titanium oxide, calcium carbonate, magnesium carbonate, talc, ferric oxide, zinc oxide, Shirasu balloons, in an amount of 5 to 200 parts by weight based on 100 parts by weight of the total amount of the reactive silicon group-containing oxyalkylene polymer (A) and the reactive silicon group-containing vinyl polymer (B), favorable results are obtained. Furthermore, generally, as the specific surface area of calcium carbonate is increased, the effects of improving the strength at break, elongation at break, and adhesiveness of the resulting cured object are increased. These fillers may of course be used alone or in combination. Precipitated calcium carbonate of which surface is treated with fatty acid can be used together with calcium carbonate of which surface is not treated, such as ground calcium carbonate, with a particle size of 1μ or more.

In order to improve workability (cutting property, etc.) of the composition and to produce a dull surface of the resulting cured object, addition of organic balloons or inorganic balloons is preferable. These fillers may be surface-treated. Only one type of balloons may be used or two or more types of balloons may be mixed for use. In order to improve workability (cutting property, etc.), the particle size of the balloons is preferably 0.1 mm or less. In order to produce a dull surface of the resulting cured object, the particle size is preferably 5 to 300 μm.

Because of good weatherability of the resulting cured object, etc., the composition of the present invention is suitable for use in joints of outer walls of houses, such as siding boards, in particular, ceramic siding boards. Desirably, the design of outer walls is in harmony with the design of the sealant. Particularly, high quality-looking outer walls have come into use by sputtered coating and by mixing of colored aggregates or the like. If the composition of the present invention comprises a flaky or granular material with a diameter of 0.1 mm or more, preferably about 0.1 to 5.0 mm, the resulting cured object harmonizes with such high quality-looking outer walls, and because of excellent weatherability, the appearance of the cured object lasts for a long period of time. If a granular material is used, the resulting cured object has a rough surface which is sandy or looks like sandstone. If a flaky material is used, the resulting cured object has an irregular surface caused by the flakes.

The preferred diameter, amount of use, materials, etc., of the flaky or granular material are described in Japanese Unexamined Patent Application Publication No. 9-53063, which will be described below.

The diameter of the flaky or granular material is 0.1 mm or more, and preferably about 0.1 to 5.0 mm, and an appropriate size is selected in accordance with the material, pattern, etc., of outer walls. A flaky or granular material with a diameter of about 0.2 mm to 5.0 mm or about 0.5 mm to 5.0 mm can also be used. In the case of a flaky material, the thickness is set at about one tenth to one fifth of the diameter (i.e., a thickness of about 0.01 to 1.00 mm). The flaky or granular material is preliminarily mixed in the sealant base material and transported to the construction site as the sealant. Alternatively, the flaky or granular material is mixed in the sealant base material immediately before use at the construction site.

The flaky or granular material is used in an amount of about 1 to 200 parts by weight based on 100 parts by weight of the sealant composition. The amount of use is appropriately selected according to the size of each piece of the flaky material or granular material, and the material, pattern, etc., of outer walls.

Examples of the flaky or granular material which may be used include natural substances, such as silica sand and mica, synthetic rubber, synthetic resins, and inorganic substances, such as alumina. In order to enhance design function when joints are filled with the composition, the flaky or granular material is appropriately colored in accordance with the material, pattern, etc., of outer walls.

A preferred finishing method, etc. is described in Japanese Unexamined Patent Application Publication No. 9-53063.

Furthermore, if balloons (preferably with an average particle size of 0.1 mm or more) are used for the same purpose, a rough surface which is sandy or looks like sandstone is produced and weight reduction is achieved. The preferred diameter, amount of use, materials, etc., of the balloons are described in Japanese Unexamined Patent Application Publication No. 10-251618, which will be described below.

Balloons are hollow spherical particles serving as a filler. Examples of the material for balloons include inorganic materials, such as glass, Shirasu, and silica; and organic materials, such as phenolic resins, urea resins, polystyrenes, and sarans. The material is not limited thereto, and a composite of inorganic and organic materials may be produced, or a multi-layered structure may be formed. Balloons composed of an inorganic material, an organic material, or a composite of these materials can be used. Balloons composed of a single material may be used, or mixed balloons composed of a plurality of different materials may be used. Furthermore, balloons whose surfaces are processed or coated may be used, and balloons whose surfaces are treated with various finishing agents may also be used. For example, organic balloons are coated with calcium carbonate, talc, titanium oxide, or the like, and inorganic balloons are surface-treated with a silane coupling agent.

In order to obtain a rough surface which is sandy or looks like sandstone, preferably, balloons have a particle size of 0.1 mm or more. Balloons with a particle size of about 0.2 mm 5.0 mm or about 0.5 mm to 5.0 mm can also be used. If the particle size is less than 0.1 mm, even if a large amount of balloons is added, in some cases, only the viscosity of the composition is increased and surface roughness is not exhibited. The amount of the balloons used can be easily set depending on the degree of roughness of a target surface which is sandy or looks like sandstone. Generally, balloons with a particle size of 0.1 mm or more are added to the composition preferably in a volume concentration of 5% to 25% by volume. If the volume concentration of balloons is less than 5% by volume, surface roughness is not exhibited. If the volume concentration exceeds 25% by volume, the viscosity of the sealant increases, workability decreases, and also the modulus of the resulting cured object increases. Thus, the basic performance of the sealant tends to be impaired. In view of balance with the basic performance of the sealant, a volume concentration of 8% to 22% by volume is particularly preferable.

When balloons are used, an anti-slip agent, such as one described in Japanese Unexamined Patent Application Publication No. 2000-154368, may be added. In order to produce a dull surface along with a rough surface of the resulting cured object, an amine compound, in particular, a primary and/or secondary amine with a melting point of 35° C. or more, may be added, as described in Japanese Unexamined Patent Application Publication No. 2001-164237.

Specific examples of balloons are described in Japanese Unexamined Patent Application Publication Nos. 2-129262, 4-8788, 4-173867, 5-1225, 7-113073, 9-53063, 10-251618, 2000-154368, and 2001-164237, WO97/05201, etc.

If the composition of the present invention contains cured particles of sealant, the resulting cured object has a rough surface, and thus design function can be enhanced. The preferred diameter, amount of use, materials, etc., of the cured particles of sealant are described in Japanese Unexamined Patent Application Publication No. 2001-115142, which will be described below. The diameter is 0.1 mm to 1 mm, and preferably about 0.2 to 0.5 mm. The content of cured particles of sealant in the curable composition is 5% to 100% by weight, and preferably 20% to 50% by weight. Examples of the material include urethane resins, silicones, modified silicones, and polysulfide rubber. Any material usable for sealants can be used, but sealants composed of modified silicones are preferred.

Along with the oxyalkylene polymeric plasticizer, another plasticizer component can be appropriately added to the composition of the present invention. The plasticizer is not particularly limited and can be selected according to the purposes, such as control of physical properties and adjustment of properties. Examples of the plasticizer include phthalates, such as dibutyl phthalate, diheptyl phthalate, di(2-ethylhexyl) phthalate, and butyl benzyl phthalate; nonaromatic dibasic acid esters, such as dioctyl adipate, dioctyl sebacate, dibutyl sebacate, and isodecyl succinate; fatty acid esters, such as butyl oleate and methyl acetyl ricinoleate; phosphates, such as tricresyl phosphate and tributyl phosphate; trimellitic acid esters; chlorinated paraffins; hydrocarbon oils, such as alkyldiphenyls and partially hydrogenated terphenyls; process oils; epoxy plasticizers, such as epoxidized soybean oil and benzyl epoxystearate; polyester plasticizers; and acrylic moiety-containing plasticizers, such as polymers of acrylic monomers, e.g., acrylates and acrylamide. These plasticizers may be used alone or in combination, and are not always necessary. Additionally, these plasticizers may be compounded during the production of polymers. When the plasticizer other than the oxyalkylene polymeric plasticizer is used in the composition of the present invention, the ratio, by weight, of the oxyalkylene polymeric plasticizer to the other plasticizer is preferably 90/10 to 10/90, and more preferably 70/30 to 30/70.

In the composition of the present invention, preferably an acrylic moiety-containing plasticizer is used together with the oxyalkylene polymeric plasticizer. The acrylic moiety-containing plasticizer is a polymer of an acrylic monomer, such as an acrylate or acrylamide. As the polymer, a polymer of an acrylate including a copolymer of acrylates, or a copolymer of an acrylate and another monomer is preferable. Specific examples of the acrylate include the acrylates used for producing the component (B) of the present invention. As the acrylate, an alkyl acrylate is preferable, and in particular, an alkyl acrylate containing an alkyl group having 1 to 8 carbon atoms, such as butyl acrylate or ethyl acrylate, is preferable. By the addition of such a plasticizer, the viscosity and slump property of the curable composition and the mechanical properties, such as tensile strength and elongation at break, of the cured object obtained from the composition can be controlled, and it is also possible to maintain good weatherability for a longer period of time compared with the use of a plasticizer not containing an acrylic moiety in its molecule. Furthermore, if an acrylic moiety-containing plasticizer, in particular, an acrylic polymer prepared by a SGO process, which will be described below, is used, the elongation at break of the resulting cured object increases compared with the use of a plasticizer other than the acrylic moiety-containing plasticizer. Consequently, as described above, when a sealant which produces a cured object with high elongation at break that is necessary for the sealant for siding boards is produced using a polymer with a number-average molecular weight of 16,000 or more as the oxyalkylene polymer (A), use of an acrylic moiety-containing plasticizer together with the oxyalkylene polymeric plasticizer is highly suitable.

The number-average molecular weight of the acrylic moiety-containing plasticizer is preferably 500 to 15,000, more preferably 800 to 10,000, still more preferably 1,000 to 8,000. If the molecular weight is too low, bleeding of the plasticizer occurs with time due to heat and rainfall, and thereby it is likely that the original physical properties cannot be maintained for a long period of time and weatherability also cannot be improved. If the molecular weight is too high, viscosity increases, and workability tends to decrease. Since the acrylic moiety-containing plasticizer functions as a plasticizer, its viscosity is usually lower than that of either one or both of the reactive silicon group-containing vinyl polymer (B) and the reactive silicon group-containing oxyalkylene polymer (A). In particular, the acrylic moiety-containing plasticizer preferably has a viscosity that is lower than that of the reactive silicon group-containing oxyalkylene polymer (A). The number-average molecular weight of the acrylic moiety-containing plasticizer is lower than that of either one or both of the reactive silicon group-containing oxyalkylene polymer (A) and the reactive silicon group-containing vinyl polymer (B) preferably by 1,000 or more, more preferably 2,000 or more, and particularly preferably 3,000 or more. The number-average molecular weight of the acrylic moiety-containing plasticizer is determined in terms of polystyrene by GPC. The molecular weight distribution (Mw/Mn) is determined by GPC (polystyrene equivalent).

Specific examples of the acrylic moiety-containing plasticizer include, but are not limited to, (meth)acrylic polymers with a molecular weight distribution of 1.8 or less produced by living radical polymerization which are proposed in Japanese Unexamined Patent Application Publication No. 2000-178456. Furthermore, polymers produced via the SGO process by Toagosei Co., Ltd. or Johnson Polymer Corporation, which are described in "Kogyo zairyo (Industrial materials)" August 1998, p. 110, can also be used. SGO polymers can be obtained by subjecting acrylate monomers to continuous bulk polymerization at high temperature and high pressure. Acrylic moiety-containing plasticizers which are liquid at room temperature and which do not contain a functional group are usually used. These may be used alone or in combination. Furthermore, depending on the need, a low molecular weight plasticizer may be used concomitantly in such an extent that physical properties are not adversely affected. The acrylic moiety-containing plasticizer may be an acrylic polymer not containing a reactive silicon group or a reactive silicon group-containing acrylic polymer. By using the hydroxyl group of a hydroxyl group-containing polymer produced by the SGO process, a reactive silicon group can be introduced by a method similar to the method of introducing a reactive silicon group for the reactive silicon group-containing oxyalkylene polymer (A). The reactive silicon group-containing acrylic polymer functions as a reactive plasticizer and has effects such as preventing the plasticizer from bleeding out from the resulting cured object. If the average number of reactive silicon groups per molecule exceeds 1, tensile properties of the resulting cured object is greatly affected. An acrylic moiety-containing plasticizer with an average number of reactive silicon groups of 1 or less per molecule, such as an acrylic polymer, is preferable as the reactive plasticizer.

A physical property-adjusting agent for adjusting the tensile properties of the resulting cured object may be added to the curable composition of the present invention as required. Examples of the physical property-adjusting agent include, but are not limited to, alkylalkoxysilanes, such as methyltrimethoxysilane, dimethyldimethoxysilane, trimethylmethoxysilane, and n-propyltrimethoxysilane; functional group-containing alkoxysilanes, such as alkylisopropenoxysilanes, e.g., dimethyldiisopropenoxysilane, methyltriisopropenoxysilane, and γ-glycidoxypropylmethyldiisopropenoxysilane, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)-γ-aminopropylmethyldimethoxysilane, γ-mercaptopropyltrimethoxysilane, and γ-mercaptopropylmethyldimethoxysilane; silicone varnishes; and polysiloxanes. By using the physical property-adjusting agent, when the composition of the present invention is cured, hardness is increased or decreased and elongation at break is increased. The above-described physical property-adjusting agents may be used alone or in combination.

In particular, a compound which produces by hydrolysis a compound having a monovalent silanol group in the molecule has the effect of decreasing the modulus of the resulting cured object without increasing the surface tackiness of the cured object. In particular, a compound producing trimethylsilanol is preferable. Examples of the compound which produces by hydrolysis a compound having a monovalent silanol group in the molecule include compounds described in Japanese Unexamined Patent Application Publication No. 5-117521; compounds which are derivatives of alkyl alcohol, such as hexanol, octanol, or decanol, and which produce by hydrolysis silicon compounds which produce $R_3SiOH$, such as trimethylsilanol; compounds which are derivatives of polyhydric alcohols having 3 or more hydroxyl groups, such as trimethylolpropane, glycerol, pentaerythritol, or sorbitol, and which produce by hydrolysis silicon compounds which produce $R_3SiOH$, such as trimethylsilanol, as described in Japanese Unexamined Patent Application Publication No. 11-241029.

Other examples include compounds which are derivatives of oxyalkylene polymers and which produce by hydrolysis silicon compounds which produce $R_3SiOH$, such as trimethylsilanol, as described in Japanese Unexamined Patent Application Publication No. 7-258534; and a polymer having a crosslinkable, hydrolyzable silicon-containing group and a silicon-containing group which can produce a monosilanol-containing compound by hydrolysis, as described in Japanese Unexamined Patent Application Publication No. 6-279693.

The physical property-adjusting agent is used in an amount of 0.1 to 20 parts by weight, preferably 0.5 to 10 parts by weight, based on 100 parts by weight of the total amount of the reactive silicon group-containing oxyalkylene polymer (A) and the reactive silicon group-containing vinyl polymer (B).

In the curable composition of the present invention, a thixotropy-providing agent (anti-sagging agent) may be added as required in order to prevent sagging and to improve workability. Examples of the anti-sagging agent include, but are not limited to, polyamide waxes; hydrogenated castor oil derivatives; and metal soaps, such as calcium stearate, aluminum stearate, and barium stearate. These thixotropy-providing agents (anti-sagging agents) may be used alone or in combination. The thixotropy-providing agent is used in an amount of 0.1 to 20 parts by weight based on 100 parts by weight of the total amount of the reactive silicon group-containing oxyalkylene polymer (A) and the reactive silicon group-containing vinyl polymer (B).

In the composition of the present invention, a compound containing an epoxy group per molecule can be used. By using an epoxy group-containing compound, recovery properties of the resulting cured object can be enhanced. Examples of the epoxy group-containing compound include epoxidized unsaturated oils and fats, epoxidized unsaturated fatty acid esters, alicyclic epoxy compounds, epichlorohydrin derivatives, and mixtures of these compounds. Specific examples include epoxidized soybean oil, epoxidized linseed oil, di-(2-ethylhexyl)4,5-epoxycyclohexane-1,2-dicarboxylate (E-PS), epoxyoctyl stearate, and epoxybutyl stearate. Among them, E-PS is particularly preferable. In order to enhance recovery properties of the resulting cured object, a compound containing one epoxy group per molecule is preferably used. The epoxy compound is used preferably in an amount of 0.5 to 50 parts by weight based on 100 parts by weight of the total amount of the reactive silicon group-containing oxyalkylene polymer (A) and the reactive silicon group-containing vinyl polymer (B).

In the composition of the present invention, a photo-curable material can be used. By using a photo-curable material, a film of the photo-curable material is formed on the surface of the resulting cured object, and tackiness of the cured object and weatherability of the cured object can be improved. In the photo-curable material, the molecular structure is chemically changed by the action of light in a fairly short period of time to cause changes in physical properties, such as curing. As the compound of this type, organic monomers, oligomers, resins, or compositions containing these compounds, and many others are known, and any commercially available material can be employed. Typical examples thereof include unsaturated acrylic compounds, polyvinyl cinnamates, and azidized resins. As the unsaturated acrylic compounds, monomers or oligomers containing one to several unsaturated acrylic or methacrylic groups, or mixtures thereof, can be used, and examples thereof include monomers, such as propylene (or butylene, ethylene) glycol di(meth)acrylate and neopentyl glycol di(meth)acrylate, and oligoesters with a molecular weight of 10,000 or less. Specific examples thereof include special acrylates (bifunctional), such as ARONIX M-210, ARONIX M-215, ARONIX M-220, ARONIX M-233, ARONIX M-240, and ARONIX M-245;special acrylates (trifunctional), such as ARONIX M-305, ARONIX M-309, ARONIX M-310, ARONIX M-315, ARONIX M-320, and ARONIX M-325; and special acrylates (multifunctional), such as ARONIX M-400. In particular, compounds containing acrylic functional groups are preferable, and compounds containing on average three or more acrylic functional groups per molecule are preferable. (The ARONIX compounds described above are products of Toagosei Co., Ltd.)

Examples of polyvinyl cinnamates include photosensitive resins having cinnamoyl groups as photosensitive groups, such as one obtained by esterification of polyvinyl alcohol with cinnamic acid, and many other polyvinyl cinnamate derivatives. Azidized resins are known as photosensitive resins having azido groups as photosensitive groups, and typical examples include sensitizing rubber solutions in which diazido compounds are added as sensitizers. In addition, "Kankosei jushi (Photosensitive resins)" (published on Mar. 17, 1972, by Insatsu Gakkai Shuppanbu, from page 93, from page 106, and from page 117), describes detailed examples. These may be used alone or in combination, and as necessary, with an addition of a sensitizer. In some cases, the effect can be enhanced by the addition of a sensitizer, such as a ketone or nitro compound, or an accelerator, such as an amine.

The photo-curable material is used in an amount of preferably 0.01 to 20 parts by weight, more preferably 0.5 to 10 parts by weight, based on 100 parts by weight of the total amount of the reactive silicon group-containing oxyalkylene polymer (A) and the reactive silicon group-containing vinyl polymer (B). If the amount is less than 0.01 parts by weight, the effect of enhancing weatherability is low. If the amount exceeds 20 parts by weight, the resulting cured object becomes too hard, resulting in cracking, which is disadvantageous.

In the composition of the present invention, an oxygen-curable material can be used. An example of the oxygen-curable material is an unsaturated compound reactable with oxygen in air. The oxygen-curable material reacts with oxygen in air to form a cured film in the surface vicinity of the resulting cured object, and thus preventing the surface tackiness and preventing dust and dirt from adhering to the surface of the cured object. Specific examples of the oxygen-curable material include drying oil, such as tung oil and linseed oil;

various types of alkyd resin obtained by modification of the compound; acrylic polymers, epoxy resins, and silicone resins modified with drying oil; liquid polymers, such as 1,2-polybutadiene, 1,4-polybutadiene, and polymers of C5 to C8 dienes which are prepared by polymerization or copolymerization of diene compounds, e.g., butadiene, chloroprene, isoprene, and 1,3-pentadiene; liquid copolymers, such as NBR and SBR, obtained by copolymerizing such diene compounds with monomers copolymerizable with the diene compounds, such as acrylonitrile and styrene, so that the diene compounds predominate; and modified copolymers of these compounds (maleic acid-modified products, boiled oil-modified products, etc.). These materials may be used alone or in combination. Among them, tung oil and liquid diene-based polymers are particularly preferable. In some cases, the effect may be enhanced by using the oxygen-curable material together with a catalyst which accelerates oxidative curing reaction or a metal dryer. Examples of such a catalyst or metal dryer include metal salts, such as cobalt naphthenate, lead naphthenate, zirconium naphthenate, cobalt octylate, and zirconium octylate; and amine compounds. The oxygen-curable material is used in an amount of preferably 0.1 to 20 parts by weight, more preferably 1 to 10 parts by weight, based on 100 parts by weight of the reactive silicon group-containing oxyalkylene polymer (A) and the reactive silicon group-containing vinyl polymer (B). If the amount of use is less than 0.1 parts by weight, improvement in staining properties becomes insufficient. If the amount of use exceeds 20 parts by weight, tensile properties, etc., of the resulting cured object tend to be impaired. As described in Japanese Unexamined Patent Application Publication No. 3-160053, the oxygen-curable material is preferably used together with a photo-curable material.

In the composition of the present invention, an antioxidant (anti-aging agent) can be used. By using an antioxidant, it is possible to enhance weatherability of the resulting cured object. Examples of the antioxidant include hindered phenol, monophenol, bisphenol, and polyphenol antioxidants. In particular, hindered phenol antioxidants are preferable. Similarly, hindered amine light stabilizers can be used, and examples thereof include TINUVIN 622LD, TINUVIN 144, CHIMASSORB 944LD, and CHIMASSORB 119FL (all of which are manufactured by Ciba Specialty Chemicals); Adekastab LA-57, Adekastab LA-62, Adekastab LA-67, Adekastab LA-63, and Adekastab LA-68 (all of which are manufactured by Asahi Denka Kogyo K.K.); Sanol LS-770, Sanol LS-765, Sanol LS-292, Sanol LS-2626, Sanol LS-1114, Sanol LS-744 (all of which are manufactured by Sankyo Co., Ltd.). Specific examples of the antioxidant are also described in Japanese Unexamined Patent Application Publication Nos. 4-283259 and 9-194731. The antioxidant is used in an amount of preferably 0.1 to 10 parts by weight, more preferably 0.2 to 5 parts by weight, based on 100 parts by weight of the total amount of the reactive silicon group-containing oxyalkylene polymer (A) and the reactive silicon group-containing vinyl polymer (B).

In the composition of the present invention, a light stabilizer can be used. By using a light stabilizer, it is possible to prevent the resulting cured object from degrading due to photo-oxidation. Examples of the light stabilizer include benzotriazole, hindered amine, and benzoate compounds. In particular, hindered amine compounds are preferable. The light stabilizer is used in an amount of preferably 0.1 to 10 parts by weight, more preferably 0.2 to 5 parts by weight, based on 100 parts by weight of the total amount of the reactive silicon group-containing oxyalkylene polymer (A) and the reactive silicon group-containing vinyl polymer (B). Specific examples of the light stabilizer are also described in Japanese Unexamined Patent Application Publication No. 9-194731.

When a photo-curable material is added to the composition of the present invention, and in particular, when an unsaturated acrylic compound is used, a tertiary amine-containing hindered amine light stabilizer is preferably used in order to improve the preservation stability of the composition, as described in Japanese Unexamined Patent Application Publication No. 5-70531. Examples of the tertiary amine-containing hindered amine light stabilizer include TINUVIN 622LD, TINUVIN 144, and CHIMASSORB 119FL (all of which are manufactured by Ciba Specialty Chemicals); Adekastab LA-57, Adekastab LA-62, Adekastab LA-67, and Adekastab LA-63 (all of which are manufactured by Asahi Denka Kogyo K.K.); Sanol LS-765, LS-292, LS-2626, LS-1114, and LS-744 (all of which are manufactured by Sankyo Co., Ltd.).

In the present invention, an ultraviolet absorber can be used. By using an ultraviolet absorber, surface weatherability of the resulting cured object can be enhanced. Examples of the ultraviolet absorber include benzophenone-based, benzotriazole-based, salicylate-based, substituted tolyl, and metal chelate compounds. In particular, benzotriazole-based compounds are preferable. The ultraviolet absorber is used in an amount of preferably 0.1 to 10 parts by weight, more preferably 0.2 to 5 parts by weight, based on 100 parts by weight of the total amount of the reactive silicon group-containing oxyalkylene polymer (A) and the reactive silicon group-containing vinyl polymer (B). Preferably, a phenol or hindered phenol antioxidant, a hindered amine light stabilizer, and a benzotriazole-based ultraviolet absorber are used together.

An epoxy resin may be added to the composition of the present invention for use as an elastic adhesive. Examples of the epoxy resin include epichlorohydrin-bisphenol A epoxy resins, epichlorohydrin-bisphenol F epoxy resins, flame retardant epoxy resins, such as glycidyl ethers of tetrabromobisphenol A, novolak epoxy resins, hydrogenated bisphenol A epoxy resins, bisphenol A propylene oxide adduct glycidyl ether-type epoxy resins, p-oxybenzoic acid glycidyl ether ester-type epoxy resins, m-aminophenol epoxy resins, diaminodiphenylmethane epoxy resins, urethane-modified epoxy resins, various alicyclic epoxy resins, N,N-glycidylaniline, N,N-diglycidyl-o-toluidine, triglycidyl isocyanurate, polyalkylene glycol diglycidyl ethers, glycidyl ethers of polyhydric alcohols such as glycerol, hydantoin-type epoxy resins, and epoxidized unsaturated polymers such as petroleum resin. The epoxy resin is not limited thereto, and any commonly used epoxy resin can be used. An epoxy resin having at least two epoxy groups per molecule is preferable from the standpoints that curing reactivity is high and that the resulting cured object easily forms a three-dimensional crosslinked structure. Bisphenol A epoxy resins and novolak epoxy resins are more preferable. With respect to the ratio, by weight, of the total amount of the reactive silicon group-containing oxyalkylene polymer (A) and the reactive silicon group-containing vinyl polymer (B) to the amount of the epoxy resin used, ((A)+(B))/epoxy resin=100/1 to 1/100. If the ratio ((A)+(B))/epoxy resin is less than 1/100, it becomes difficult to obtain the effect of improving impact strength and toughness of the cured object of the epoxy resin. If the ratio ((A)+(B))/epoxy resin exceeds 100/1, strength of the cured object of the oxyalkylene polymer becomes insufficient. The preferred amount of use depends on the application of the curable resin composition, etc. For example, in order to improve impact resistance, flexibility, toughness, peel strength, etc., of the cured object of the epoxy resin, the total amount of the component (A) and the component (B) is set at preferably 1 to 100 parts by weight, more preferably 5 to 100 parts by weight, based on 100 parts by weight of the epoxy resin. On the other hand, in order to improve strength of the cured object of the component (A) and the component (B), the epoxy resin is used in an amount of preferably 1 to 200 parts by weight, more preferably 5 to 100 parts by weight, based on 100 parts by weight of the total amount of the component (A) and the component (B).

When an epoxy resin is used, it is of course possible to use a curing agent for curing the epoxy resin together. The epoxy resin curing agent which may be used is not particularly limited, and any commonly used epoxy resin curing agent can be used. Specific examples include, but are not limited to, primary and secondary amines, such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyether; tertiary amines, such as 2,4,6-tris(dimethylaminomethyl)phenol and tripropylamine, and salts of these tertiary amines; polyamide resins; imidazoles; dicyandiamides; boron trifluoride complex compounds; carboxylic anhydrides, such as phthalic anhydride, hexahydrophthalic anhydride, tetrahydrophthalic anhydride, dodecylsuccinic anhydride, pyromellitic anhydride, and chlorendic anhydride; alcohols; phenols; carboxylic acids; and diketone complexes of aluminum or zirconium. These curing agents may be used alone or in combination.

The epoxy resin curing agent is used in an amount of 0.1 to 300 parts by weight based on 100 parts by weight of the epoxy resin.

As the epoxy resin curing agent, a ketimine can be used. A ketimine is stable in the absence of moisture and is decomposed into a primary amine and a ketone by moisture. The resultant primary amine functions as a room temperature curing agent for epoxy resin. By using ketimines, one-part compositions can be obtained. Such a ketimine can be obtained by condensation reaction between an amine compound and a carbonyl compound.

In order to synthesize a ketimine, any known amine compound and carbonyl compound can be used. Examples of the amine compound which may be used include diamines, such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine; polyamines, such as 1,2,3-triaminopropane, triaminobenzene, tris(2-aminoethyl)amine, and tetra(aminomethyl)methane; polyalkylenepolyamines, such as diethylenetriamine, triethylenetriamine, and tetraethylenepentamine; polyoxyalkylenepolyamines; and aminosilanes, such as γ-aminopropyltriethoxysilane, N-(β-aminoethyl)-γ-aminopropyltrimethoxysilane, and N-(β-aminoethyl)-β-aminopropylmethyldimethoxysilane. Examples of the carbonyl compound which may be used include aldehydes, such as acetaldehyde, propionaldehyde, n-butylaldehyde, isobutylaldehyde, diethylacetaldehyde, glyoxal, and benzaldehyde; cyclic ketones, such as cyclopentanone, trimethylcyclopentanone, cyclohexanone, and trimethylcyclohexanone; aliphatic ketones, such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds, such as acetylacetone, methyl acetoacetate, ethyl acetoacetate, dimethyl malonate, diethyl malonate, methylethyl malonate, and dibenzoylmethane.

When the ketimine contains an imino group, the imino group may be reacted with styrene oxide; a glycidyl ether, such as butyl glycidyl ether or allyl glycidyl ether; or a glycidyl ester. These ketimines may be used alone or in combination. The ketimine is used in an amount of 1 to 100 parts by weight based on 100 parts by weight of the epoxy resin. The amount of use depends on the types of epoxy resin and ketimine.

The curable composition of the present invention may be incorporated with various additives as required in order to adjust physical properties of the curable composition or the resulting cured object. Examples of such additives include flame retardants, curability-adjusting agents, radical inhibitors, metal deactivators, antiozonants, phosphorus-containing peroxide decomposers, lubricants, pigments, foaming agents, solvents, and mildewproofing agents. Each of various types of additives may be used alone or in combination. Specific examples of additives other than the specific examples described in this specification are described, for example, in Japanese Examined Patent Application Publication Nos. 4-69659 and 7-108928, and Japanese Unexamined Patent Application Publication Nos. 63-254149, 64-22904, and 2001-72854.

The curable composition of the present invention can be prepared as a one-part curable composition in which all the components are preliminarily mixed and hermetically sealed, and which is cured by moisture in air after being applied to a desired place. Alternatively, the curable composition of the present invention can be prepared as a two-part curable composition in which a mixture of components, such as a curing catalyst, a filler, a plasticizer, and water, is separately prepared as a curing agent, and the mixture and the polymer composition are mixed immediately before use.

In the case of one-part curable composition, since all the components are preliminarily mixed, preferably, water-containing components are used after being dehydrated and dried, or dehydration is performed during mixing by pressure reduction or the like. In the case of two-part curable composition, since it is not necessary to mix a curing catalyst into the base resin comprising the reactive silicon group-containing polymer, even if a slight amount of water is contained in the mixture of components, there is a low possibility of gelation. However, when long-term storage stability is required, dehydration and drying are preferably performed. As the dehydration and drying methods, in the case of solid objects, such as powder, drying by heating is suitable, and in the case of liquid objects, dehydration under reduced pressure or dehydration using synthetic zeolite, activated alumina, silica gel, or the like, is suitable. Furthermore, a small amount of isocyanate compound may be added to perform dehydration by reacting isocyanato groups with water. In addition to such dehydration and drying methods, by adding a lower alcohol, such as methanol or ethanol; or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane, storage stability is further improved.

The dehydrating agent, in particular, a silicon compound reactable with water, such as vinyltrimethoxysilane, is used in an amount of 0.1 to 20 parts by weight, preferably 0.5 to 10 parts by weight, based on 100 parts by weight of the total amount of the reactive silicon group-containing polyoxyalkylene (A) and the reactive silicon group-containing vinyl polymer (B).

BEST MODE FOR CARRYING OUT THE INVENTION

While the present invention will be described in detail based on the examples below, it is to be understood that the invention is not limited thereto.

SYNTHESIS EXAMPLE 1

Into 50 g of toluene heated at 105° C., a mixed solution of 14.5 g of methyl methacrylate, 68.5 g of butyl acrylate, 15 g of stearyl methacrylate, 2 g of γ-methacryloxypropylmethyldimethoxysilane, 0.5 g of 2,2'-azobis(2-methylbutyronitrile), and 20 g of toluene was dripped for over 5 hours. "Postpolymerization" was then performed for 1 hour to produce a vinyl copolymer.

SYNTHESIS EXAMPLE 2

A heat-resistant glass reactor equipped with an agitator was charged with 500 g of linear, allyl group-terminated polypropylene oxide having a backbone chain prepared using a double metal cyanide complex catalyst and having a number-average molecular weight of 20,000, and 10 g of hexane, and azeotropic dehydration was carried out at 90° C. After hexane was distilled off under reduced pressure, the reactor was nitrogen-purged, and 20 µl of chloroplatinic acid catalyst (5% by weight isopropanol solution in terms of platinum) was added thereto. While stirring, 4.6 g of dimethoxymethylsilane (DMS) was slowly added dropwise to the mixture. The mixed solution was subjected to reaction for 2 hours at 90° C., and unreacted DMS was distilled off under reduced pressure. A silylated polymer was thereby produced.

SYNTHESIS EXAMPLE 3

As in Synthesis Example 2, linear, dimethoxymethylsilyl group-terminated polypropylene oxide having a backbone chain prepared using a double metal cyanide complex catalyst and having a number-average molecular weight of 10,000 was produced.

SYNTHESIS EXAMPLE 4

After the polymer produced in Synthesis Example 2 and the copolymer produced in Synthesis Example 1 were blended at a solid weight ratio of 70/30, the solvent was distilled off to produce a solventless polymer (A). At a blend ratio of 75/25, the polymer viscosity was 49.8 Pa·s. At a blend ratio of 70/30, the viscosity was 60.7 Pa·s. At a blend ratio of 65/35, the viscosity was 86.2 Pa·s. (Measurement was performed using a BM type viscometer, No. 4 rotor, at 23° C.)

SYNTHESIS EXAMPLE 5

After the polymer produced in Synthesis Example 3 and the copolymer produced in Synthesis Example 1 were blended at a solid weight ratio of 70/30, the solvent was distilled off to produce a solventless polymer (B).

SYNTHESIS EXAMPLE 6

Into 165 g of polyoxypropylene glycol (manufactured by Takeda Pharmaceutical Company Limited, ACTOCOL P-23) with a molecular weight of 3,000 heated at 105° C., a mixed solution of 14.5 g of methyl methacrylate, 68.5 g of butyl acrylate, 15 g of stearyl methacrylate, 2 g of γ-methacryloxypropylmethyldimethoxysilane, 0.5 g of 2,2'-azobis(2-methylbutyronitrile), and 17.9 g of toluene was dripped for over 5 hours. "Postpolymerization" was then performed for 2 hours to produce a vinyl copolymer. The solvent was removed by distillation from the polymer composition obtained by polymerization, and thereby a solventless polymer (C) with a molecular weight of 3,000 and a weight ratio of polyoxypropylene glycol to vinyl polymer of 55 to 30. The conversion rate of polymerization was 99%.

EXAMPLES 1 TO 3

Based on 100 parts by weight of the solventless polymer (A) obtained in Synthesis Example 4, 55 parts by weight of a polypropylene glycol (PPG) plasticizer with a number-average molecular weight of 1,000 (Diol-1000), with a number-average molecular weight of 3,000 (ACTOCOL P-23), or a molecular weight of 10,000 (polymerized using a double metal cyanide complex), 120 parts by weight of calcium carbonate (manufactured by Shiraishi Calcium Kaisha, Ltd., Trade Name: Hakuenka CCR), 20 parts by weight of titanium oxide (manufactured by Ishihara Sangyo Co., Ltd., Trade Name: TIPAQUE R-820), 2 parts by weight of a thixotropy-providing agent (Kusumoto Chemicals, Ltd., Trade Name: DISPARLON #6500), 1 part by weight of a benzotriazole-based ultraviolet absorber (manufactured by Ciba Specialty Chemicals Inc., Trade Name: TINUVIN 327), and 1 part by weight of a hindered amine light stabilizer (manufactured by Sankyo Co., Ltd., Trade Name: Sanol LS770) were weighed, mixed, and fully kneaded. The resulting mixture was passed through a small three-roll paint mill three times. Subsequently, 2 parts by weight of vinyltrimethoxysilane, 3 parts by weight of an aminosilane compound (manufactured by Nippon Unicar Company Limited, Trade Name: A-1120), and 2 parts by weight of a curing accelerator (manufactured by Nitto Kasei Co., Ltd., Trade Name: U-220) were added to the mixture, followed by kneading to produce a cured sheet sample with a thickness of 3 mm, and thus a dumbbell sample (JIS shape No. 3) for tensile testing was formed.

EXAMPLE 4

A dumbbell sample (JIS Shape No. 3) for tensile testing was formed as in Example 1 except that 100 parts by weight of the polymer obtained in Synthesis Example 2 and 85 parts by weight of the solventless polymer (C) obtained in Synthesis Example 6 were used, instead of using 100 parts by weight of the solventless polymer (A) obtained in Synthesis Example 4 and 55 parts by weight of the PPG plasticizer.

EXAMPLES 5 AND 6

A dumbbell sample (JIS shape No. 3) for tensile testing was formed by further adding 1 part by weight of balloons (with an outer shell of acrylic resin and a particle size of 30 to 50 µm, Trade Name: EXPANCEL 511DE) to the composition of each of Examples 1 and 4.

COMPARATIVE EXAMPLES 1 AND 2

A dumbbell sample (JIS shape No. 3) for tensile testing was formed as in Example 1 except that diisodecyl phthalate (DIDP) or diisooctyl phthalate (DOP) was used instead of the PPG plasticizer used in Example 1.

COMPARATIVE EXAMPLE 3

A dumbbell sample (JIS shape No. 3) for tensile testing was formed by further adding 1 part by weight of balloons (with an outer shell of acrylic resin and a particle size of 30 to 50 μm, Trade Name: EXPANCEL 511DE) to the composition of Comparative Example 1.

REFERENCE EXAMPLE 1

A dumbbell sample (JIS shape No. 3) for tensile testing was formed as in Example 1 except that an acrylic moiety-containing plasticizer (manufactured by Toagosei Co., Ltd., Trade Name: UP-1020) was used instead of the PPG plasticizer used in Example 1.

With respect to each of the dumbbell samples of Examples 1 to 6, Comparative Examples 1 to 3, and Reference Example 1, a tensile test was performed using an Autograph (manufactured by Shimadzu Corp., Model AG500C), and tensile characteristics were measured. The results thereof are shown in Table 1. In the table, "M100" indicates a modulus at 100% elongation, "Tb" indicates a strength at break, and "EB" indicates an elongation at break.

TABLE 1

| Sample | Plasticizer | $M_{100}$ (MPa) | Tb (MPa) | Eb (%) |
|---|---|---|---|---|
| Example 1 | Oxyalkylene | 0.26 | 1.66 | 750 |
| Example 2 | Oxyalkylene | 0.32 | 1.74 | 690 |
| Example 3 | Oxyalkylene | 0.32 | 1.90 | 660 |
| Example 4 | Oxyalkylene | 0.22 | 1.88 | 955 |
| Example 5 | Oxyalkylene (incorporated with balloons) | 0.39 | 1.31 | 430 |
| Example 6 | Oxyalkylene (incorporated with balloons) | 0.28 | 1.30 | 610 |
| Comparative Example 1 | DIDP | 0.32 | 1.77 | 640 |
| Comparative Example 2 | DOP | 0.32 | 1.83 | 670 |
| Comparative Example 3 | DIDP (incorporated with balloons) | 0.38 | 1.30 | 410 |
| Reference Example 1 | UP-1020 | 0.32 | 1.91 | 710 |

REFERENCE EXAMPLE 2

A dumbbell sample (JIS shape No. 3) for tensile testing was formed as in Reference Example 1 except that the polymer of Synthesis Example 5 was used instead of the polymer obtained in Synthesis Example 4. With respect to each of the dumbbell samples of Reference Examples 1 and 2, a tensile test was performed using an Autograph (manufactured by Shimadzu Corp., Model AG500C), and elongation at break (Eb) was measured. Surface curing time and residual tackiness were also measured with respect to each composition.

The results thereof are shown in Table 2.

TABLE 2

| | | Reference Example 1 | Reference Example 2 |
|---|---|---|---|
| Number-average molecular weight | | 20,000 | 10,000 |
| Surface curing time | Minute | 48 | 42 |
| Residual tackiness | After 3 days | ◯-⊙ | ◯-⊙ |
| | After 7 days | ◯-⊙ | ◯-⊙ |
| Dumbbell tensile properties | Eb % | 640 | 350 |

Evaluation of residual tackiness
⊙: Substantially no tackiness
◯: Slight tackiness The cured objects of the present invention have excellent elongation properties. Furthermore, by using the method for sealing ceramic siding boards comprising applying the curable composition to the siding boards in accordance with the present invention, satisfactory workability is shown and the resulting cured object has excellent elongation at break.

INDUSTRIAL APPLICABILITY

The curable compositions of the present invention are particularly useful as elastic sealants and can be used as sealing agents for buildings, ships and vessels, automobiles, roads, etc. In particular, the curable compositions are useful as sealants for joints of siding boards which are required to have weatherability and workability. Furthermore, since the curable compositions, alone or with the help of primers, are capable of adhering to a variety of substrates, such as glass, ceramics, wood, metal, and resin molded objects, the curable compositions can be also used as various types of sealing compositions and adhesive compositions. The curable compositions can be used as conventional adhesives as well as contact adhesives. Furthermore, the curable compositions are useful as food packaging materials, materials for cast rubber, molding materials, and paint.

In particular, a curable composition comprising a oxypropylene polymer which has a number-average molecular weight of 16,000 to 25,000, has a substantially linear molecular chain, and contains a reactive silicon group at the end of the molecular chain; a reactive silicon group-containing alkyl acrylate and/or alkyl methacrylate random copolymer; and an oxyalkylene polymeric plasticizer having a smaller molecular weight than that of the reactive silicon group oxypropylene polymer is extremely suitable as a sealant for ceramic siding boards. Namely, the cured object obtained from such a composition has excellent weatherability as the sealant for ceramic siding boards, and furthermore has larger elongation at break compared with a cured object obtained from the composition comprising a conventionally used plasticizer. In spite of the fact that the curable composition comprises a linear oxypropylene polymer having high viscosity and a high molecular weight of 16,000 or more as the reactive silicon group-containing oxyalkylene polymer, and a random (meth) acrylic polymer also having high viscosity as the reactive silicon group vinyl polymer, the viscosity of the curable composition is in a range usable in sealants, and also there is little difference in the curing rate compared with the case in which an oxypropylene polymer having a low molecular weight is used. In this composition, the lower limit of the number-average molecular weight of the reactive silicon group-containing oxypropylene polymer is preferably 17,000, more preferably 18,000, and particularly preferably 19,000. The upper limit is preferably 23,000, and more preferably 22,000. The most preferable range is 19,000 to 22,000. However, other combinations of the upper limit and the lower limit are preferable. Furthermore, the molecular weight of the oxyalkylene polymeric plasticizer (C) is preferably 5,000 or less, and more preferably 4,000 or less. In any one of these compositions, it is also possible to concomitantly use a polymer produced via the SGO process in which acrylate monomers are subjected to continuous bulk polymerization at high temperature and high pressure as an alkyl acrylate polymeric plasticizer having a smaller molecular weight than that of the component (B).

The invention claimed is:

1. A curable composition comprising:
   an oxyalkylene polymer (A) having a number-average molecular weight of 16,000 or more, the oxyalkylene polymer (A) containing a reactive silicon group;
   a vinyl polymer (B) containing a reactive silicon group; and
   an oxyalkylene polymeric plasticizer (C) having a smaller molecular weight than that of the polymer (A)
   wherein the vinyl polymer (B) is prepared by polymerization in the presence of the oxyalkylene polymeric plasticizer (C).

2. The curable composition according to claim 1, wherein the oxyalkylene polymer (A) is at least one selected from the group consisting of polyethylene oxide, polypropylene oxide, propylene oxide-ethylene oxide copolymers, and polybutylene oxide.

3. The curable composition according to claim 2, wherein the oxyalkylene polymer (A) is an oxypropylene polymer.

4. The curable composition according to claim 1, wherein the backbone chain of the oxyalkylene polymer (A) is a polymer prepared using a double metal cyanide complex catalyst.

5. The curable composition according to claim 1, wherein the backbone chain of the oxyalkylene polymer (A) is substantially a linear polymer.

6. The curable composition according to claim 1, wherein the reactive silicon group of the oxyalkylene polymer (A) comprises one silicon atom and two hydrolyzable groups bonded to the silicon atom.

7. The curable composition according to claim 6, wherein the reactive silicon group of the oxyalkylene polymer (A) is a dimethoxymethylsilyl group.

8. The curable composition according to claim 1, wherein the reactive silicon group of the oxyalkylene polymer (A) is present at a terminus of the molecular chain of the oxyalkylene polymer (A).

9. The curable composition according to claim 1, wherein the vinyl polymer (B) contains a monomeric unit derived from an alkyl acrylate and/or alkyl methacrylate.

10. The curable composition according to claim 9, wherein the vinyl polymer (B) contains 70% by weight or more of the monomeric unit derived from the alkyl acrylate and/or alkyl methacrylate.

11. The curable composition according to claim 1, wherein the vinyl polymer (B) has a number-average molecular weight of 5,000 to 30,000.

12. The curable composition according to claim 11, wherein the vinyl polymer (B) has a number-average molecular weight of 10,000 to 20,000.

13. The curable composition according to claim 1, wherein the oxyalkylene polymer (A) and the vinyl polymer (B) are synthesized separately.

14. The curable composition according to claim 1, wherein the ratio, by weight, of the oxyalkylene polymer (A) to the vinyl polymer (B) is 90/10 to 10/90.

15. The curable composition according to claim 1, wherein the oxyalkylene polymeric plasticizer (C) has a number-average molecular weight of 500 to 15,000.

16. The curable composition according to claim 15, wherein the oxyalkylene polymeric plasticizer (C) has a number-average molecular weight of 1,000 to 8,000.

17. The curable composition according to claim 1, wherein the amount of the oxyalkylene polymeric plasticizer (C) used is 5 to 150 parts by weight based on 100 parts by weight of the total amount of the oxyalkylene polymer (A) and the vinyl polymer (B).

18. The curable composition according to claim 17, wherein the amount of the oxyalkylene polymeric plasticizer (C) used is 10 to 120 parts by weight based on 100 parts by weight of the total amount of the oxyalkylene polymer (A) and the vinyl polymer (B).

19. The curable composition according to claim 18, wherein the amount of the oxyalkylene polymeric plasticizer (C) used is 20 to 100 parts by weight based on 100 parts by weight of the total amount of the oxyalkylene polymer (A) and the vinyl polymer (B).

20. The curable composition according to claim 1, further comprising a second plasticizer in addition to the oxyalkylene polymeric plasticizer (C).

21. The curable composition according to claim 20, wherein the ratio, by weight, of the oxyalkylene polymeric plasticizer (C) to the second plasticizer is 90/10 to 10/90.

22. The curable composition according to claim 1, further comprising a flaky or granular material with a diameter of 0.1 mm or more.

23. The curable composition according to claim 1, further comprising balloons.

24. The curable composition according to claim 23, wherein the balloons have a particle size of 0.1 mm or more.

25. The curable composition according to claim 1, wherein the curable composition is used as a sealant for joints of siding boards.

26. The curable composition according to claim 25, wherein the siding boards are ceramic siding boards.

27. A method for sealing ceramic siding boards comprising applying the curable composition according to claim 26 as a sealant to the siding boards, and curing the curable composition.

* * * * *